US009537601B2

(12) United States Patent
Fu et al.

(10) Patent No.: US 9,537,601 B2
(45) Date of Patent: Jan. 3, 2017

(54) METHOD AND DEVICE FOR TRANSMITTING DATA

(71) Applicant: ZTE CORPORATION, Shenzhen, Guangdong Province (CN)

(72) Inventors: Xihua Fu, Shenzhen (CN); Xinling Zhang, Shenzhen (CN)

(73) Assignee: ZTE CORPORATON (CN)

( * ) Notice: Subject to any disclaimer, the term of this patent is extended or adjusted under 35 U.S.C. 154(b) by 0 days.

(21) Appl. No.: 14/415,190

(22) PCT Filed: Aug. 30, 2013

(86) PCT No.: PCT/CN2013/082734
§ 371 (c)(1),
(2) Date: Jan. 16, 2015

(87) PCT Pub. No.: WO2014/059834
PCT Pub. Date: Apr. 24, 2014

(65) Prior Publication Data
US 2015/0236810 A1    Aug. 20, 2015

(30) Foreign Application Priority Data
Oct. 18, 2012    (CN) .......................... 2012 1 0397877

(51) Int. Cl.
*H04J 14/02* (2006.01)
*H04B 10/2575* (2013.01)

(52) U.S. Cl.
CPC ....... *H04J 14/0227* (2013.01); *H04B 10/2575* (2013.01)

(58) Field of Classification Search
CPC .................................................. H04J 14/0227
See application file for complete search history.

(56) References Cited

U.S. PATENT DOCUMENTS

| 2010/0158518 A1* | 6/2010 | Shin ...................... H04J 3/0605 398/45 |
| 2011/0135312 A1* | 6/2011 | El-Ahmadi ........... H04L 1/0057 398/135 |
| 2013/0108268 A1* | 5/2013 | Valiveti ................. H04J 3/1652 398/58 |

FOREIGN PATENT DOCUMENTS

| CN | 101340735 | 1/2009 |
| CN | 101489157 | 7/2009 |

(Continued)

OTHER PUBLICATIONS

S. Gorshe, "A tutorial on ITU-T G.709 Optical Transport Networks (OTN)", PMC-Sierra, Inc., 2010.*

(Continued)

*Primary Examiner* — Shi K Li
(74) *Attorney, Agent, or Firm* — McAndrews, Held & Malloy, Ltd.

(57) ABSTRACT

A method and device for transmitting data are disclosed, the method comprising: mapping the data to an ODUS, and mapping the ODUS into an OTUS, wherein the rate of the ODUS and the OTUS are M*100 Gb/s, M is a positive integer greater than or equal to 2, and the tributary slot size of the ODUS and the OTUS are 100 Gb/s; distributing the OTUS into M groups of electric channel signals, wherein each group of electric channel signals corresponds to N electric layer channels, N is a positive integer; and mapping all the data distributed into the electric channel signals by the OTUS into the same OChS for transmission, wherein the rate of the OChS is M*100 Gb/s, the M groups of electric channel signals are carried by a single frequency sequence or multiple non-continuous frequency sequences, each frequency sequence carries m groups of electric channel signals, 1≤m≤M, m is an integer. The disclosure improves (Continued)

optical fibber utilization efficiency as well as system flexibility and compatibility.

16 Claims, 7 Drawing Sheets

(56) References Cited

FOREIGN PATENT DOCUMENTS

| | | |
|---|---|---|
| CN | 102349310 | 2/2012 |
| WO | 2011/063834 | 6/2011 |

OTHER PUBLICATIONS

ISR for International Patent Application No. PCT/CN2013/082734 mailed Dec. 5, 2013.

Supplementary European Search Report dated Sep. 29, 2015, corresponding to European Patent Application No. EP 13847247.

Xihua Fu ZTE Corporation P R China: "Inverse multiplexing for ODUS;C 1992 Rev.1", ITU-T Draft; Study Period 2009-2012, International Telecommunication Union, Geneva; CH, vol. 6/15, 9/15,11/15, 12/15,14/15, Aug. 27, 2012 (Aug. 27, 2012), pp. 1-5, XP017576411, [retrieved on Aug. 27, 2012].

Josef Roese Deutsche Telekom Germany: "Requirements on OTN interfaces beyond 100 GbiVs;C 2332 Rev.1", ITU-T Draft; Study Period 2009-2012, International Telecommunication Union, Geneva; CH, vol. 11 /15,Aug. 28, 2012 (Aug. 28, 2012), pp. 1-3, XP017576515, [retrieved on Aug. 28, 2012].

Kihua Fu ZTE Corporation P R China: "Architecture Consideration for the extension of OTN Beyond 100G;C 1991 Rev.1", ITU-T Draft; Study Period 2009-2012, International Telecommunication Union, Geneva; CH, vol. 6/15,9/15,11 /15,12115,14/15, Aug. 27, 2012 (Aug. 27, 2012), pp. 1-2, XP017576409, [retrieved on Aug. 27, 2012].

Sharfuddin Syed Rajan Rao Marco Sosa Biao Lu Infinera Bert Basch Andrew G Malis Verizon Communications: "A Framework for control of Flex Grid Networks; draft-syed-ccamp-flexgridframework-ext-01.txt", A Framework for Contro of Flex Grid Networks; Draft-Syed-Ccamp-Flexgrideframework-01.Txt, Internet Engineering Task Force, IETF; Standardworkingdraft, Internet Society (ISOC) 4, Rue Des Falaises CH—1205 Geneva, Switzerland, Apr. 23, 2012.

\* cited by examiner

METHOD AND DEVICE FOR TRANSMITTING DATA

CROSS-REFERENCE TO RELATED APPLICATIONS/INCORPORATION BY REFERENCE

This application is a 371 of International Patent Application No. PCT/CN2013/082734, filed Aug. 30, 2013, entitled "DATA TRANSMISSION METHOD AND DEVICE", which claims priority to Chinese Patent Application No. 201210397877.X, filed Oct. 18, 2012, entitled "DATA TRANSMISSION METHOD AND APPARATUS". The above-identified applications are hereby incorporated herein by reference in their entirety.

TECHNICAL FIELD

The disclosure relates to the field of communications, including, e.g., a method and device for transmitting data.

BACKGROUND

The development trend of optical transmission technology presents a single channel higher rate (e.g. single channel 400 G/1 T transmission), a higher spectrum efficiency and a high order modulation format, and therefore the most clear-cut and important direction of optical transmission development is still to continue to improve the rate. The high speed transmission faces many restrictions which mainly have two aspects: on the one hand, the optical transmission technology develops towards high spectrum efficiency convergence transmission and high speed service interface transmission; if the spectrum efficiency cannot be improved continuously, it makes little sense to aggregate low speed to high speed and then to transmit; however, since there can be still a high speed Ethernet interface at a client side, a transmission problem of a high speed interface should be still considered, and 400 G will be a critical point of spectrum efficiency limitation; on the other hand, the optical transmission technology develops towards long distance (long span and multi-span), and although a system OSNR can be improved by means such as low loss fibre, low noise amplifier and reducing span interval, the improvement is limited and is difficult to make a significant breakthrough, and it is difficult to implement in engineering.

As the increasing demand for bearer network bandwidth, beyond 100 G technology becomes a solution to the bandwidth increasing demand, and whether it is 400 G or 1 T above 100 G, wavelength division multiplexing (referred to as WDM) of a traditional 50 GHz fixed grid cannot provide an enough spectrum width to achieve the beyond 100 G technology. Because of the defect of the fixed grid, it is put forward that a wider flexible grid is needed.

In the related art, beyond 100 G multi-rate hybrid transmission and beyond 100 G modulation code pattern flexibility lead to different channel bandwidth demands, and if each channel is specified an appropriate bandwidth, the system bandwidth can be made full use of, thus producing a flexible grid system. On the basis that the demands of a superspeed WDM system for continuously increasing demand for the bandwidth, the demand for flexible grid technology is introduced; however, many problems such as how to effectively plan and manage the spectrum, and the compatibility of the current system are all to be solved.

In view of the problem of how to effectively plan and manage the spectrum after introducing the flexible grid technology in the related art, no effective solution has been proposed so far.

SUMMARY

A solution for transmitted data is provided in the embodiments of the disclosure.

According to one aspect of the embodiments of the disclosure, a method for transmitting data is provided, comprises: mapping data to a super Optical channel Data Unit (ODUS), and mapping the ODUS into a super Optical channel Transport Unit (OTUS), wherein the rate of the ODUS and the OTUS are M*100 Gb/s, M is a positive integer greater than or equal to 2, and the tributary slot size of the ODUS and the OTUS are 100 Gb/s; distributing the OTUS into M groups of electrical lane signals, wherein each group of electrical lane signals corresponds to N electrical layer lanes, and N is a positive integer; then mapping all the data distributed into the electrical lane signals by the OTUS into the same Optical Channel (OChS) for transmission, wherein the rate of the OChS is M*100 Gb/s; and the M groups of electrical lane signals are carried by a single frequency slot or multiple non-continuous frequency slots, each frequency slot carries m groups of electrical lane signals, $1 \leq m \leq M$, and m is an integer.

According to an embodiment of the disclosure, mapping data to the ODUS comprises: aggregating low speed service data to an ODU4 firstly, and then mapping to the ODUS, wherein the rate of the low speed service data is less than or equal to 100 Gb/s; and mapping high speed service data to the ODUS directly, wherein the rate of the low speed service data is less than or equal to 100 Gb/s, and the rate of the high speed service data is greater than 100 Gb/s.

According to an embodiment of the disclosure, the above-mentioned low speed service data at least comprises one of the following: ODU0, ODU1, ODU2, ODU2e, ODU3, and ODUflex.

According to an embodiment of the disclosure, the above-mentioned ODUS supports at least one of the following service data: an ODU4 service, a low order ODUS service, a packet service, and a 400 G/1 T Ethernet.

According to an embodiment of the disclosure, when N is 4, a respective electrical layer lane rate of each group of electrical lane signals is 25 Gb/s; when N is 2, a respective electrical layer lane rate of each group of electrical lane signals is 50 Gb/s; and when N is 1, a respective electrical layer lane rate of each group of electrical lane signals is 100 Gb/s.

According to an embodiment of the disclosure, one of the above-mentioned frequency slots comprises one or more continuous OCs, and each of the OCs supports at least one 100 G slot.

According to another aspect of the embodiments of the disclosure, a device for transmitting data is provided, comprises: a mapping component, configured to map data to an Super Optical channel Data Unit (ODUS), and map the ODUS into an Super Optical channel Transport Unit (OTUS), wherein the rate of the ODUS and the OTUS are M*100 Gb/s, M is a positive integer greater than or equal to 2, and the tributary slot size of the ODUS and the OTUS are 100 Gb/s; an electrical layer processing component, configured to distribute the OTUS into M groups of electrical lane signals, wherein each group of electrical lane signals corresponds to N electrical layer lanes, and N is a positive integer; and a transmitting component, configured to map all the data distributed into the electrical lane signals by the OTUS into the same Optical Channel (OChS) for transmission, wherein the rate of the OChS is M*100 Gb/s, and the M groups of electrical lane signals are carried by a single frequency slot or multiple non-continuous frequency slots, each frequency slot carries m groups of electrical lane signals, $1 \le m \le M$, and m is an integer.

According to an embodiment of the disclosure, the mapping component is further configured to aggregate low speed service data to an ODU4 firstly, then map to the ODUS, and map high speed service data to the ODUS directly, wherein the rate of the low speed service data is less than or equal to 100 Gb/s, and the rate of the high speed service data is greater than 100 Gb/s.

According to an embodiment of the disclosure, the above-mentioned ODUS supports at least one of the following service data: an ODU4 service, a low order ODUS service, a packet service, and 400 GE/1 TE.

According to an embodiment of the disclosure, one of the above-mentioned frequency slots comprises one or more continuous optical carriers (OCs), and each of the OCs supports at least one 100 G slot.

In the embodiments of the disclosure, by means of mapping data to a super optical channel data unit and mapping the super optical channel data unit into a super optical channel transport unit, then distributing the super optical channel transport unit into multiple electrical lane signals of multiple electrical layer lanes, and finally mapping all the data distributed into the multiple electrical lane signals into the same super optical channel for transmission, the problem of how to effectively plan and manage the spectrum after introducing the flexible grid technology in the related art is solved, so that the operator can deploy a beyond 100 G optical transport system more flexibly and is no longer limited to the selection of a fixed rate, improving optical fibre spectrum utilization efficiency as well as system flexibility and compatibility.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the present application and the features of the embodiments can be combined with each other if there is no conflict.

Figure 1:
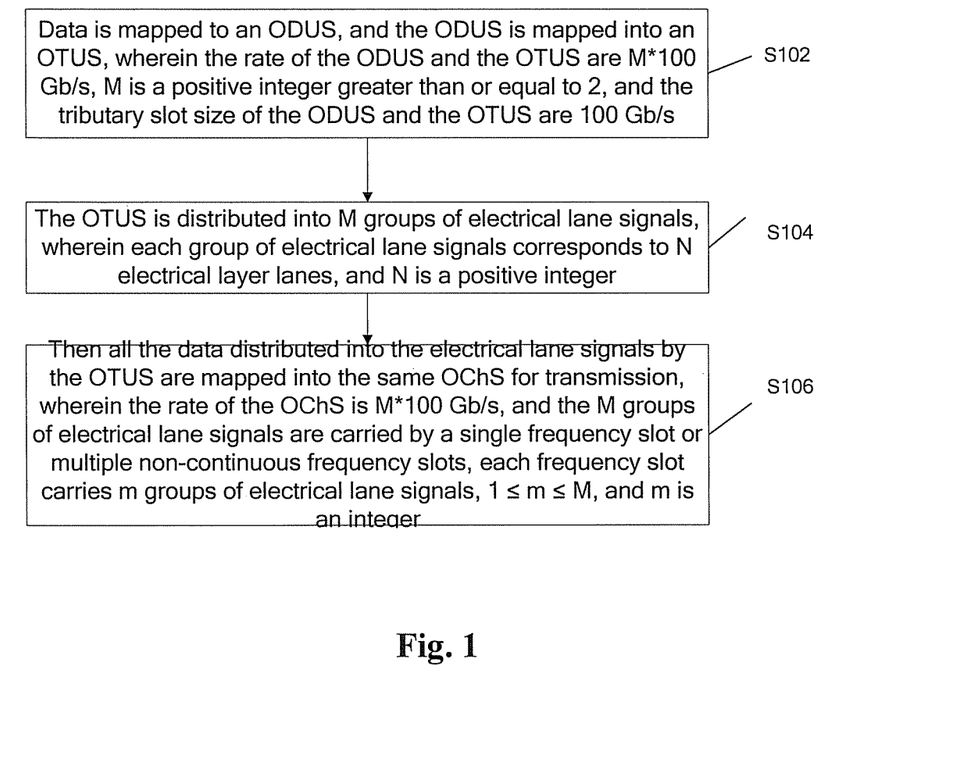
FIG. 1 shows a flowchart of a method for transmitting data according to an embodiment of the disclosure.

According to the embodiments of the disclosure, a method for transmitting data is provided. FIG. 1 shows a flowchart of a method for transmitting data according to an embodiment of the disclosure. As shown in FIG. 1, the method comprises the following steps:

Step S102, data is mapped to a super optical channel data unit (recorded as ODUS, but this identifier does not represent defining the term), and the ODUS is mapped into a super optical channel transport unit (recorded as OTUS, but this identifier does not represent defining the term), wherein the rate of the ODUS and the OTUS are M*100 Gb/s, M is a positive integer greater than or equal to 2, and the tributary slot size of the ODUS and the OTUS are 100 G bit/s (i.e. Gb/s);

Step S104, the OTUS is distributed into M groups of electrical lane signals, wherein each group of electrical lane signals corresponds to N electrical layer lanes, and N is a positive integer; and Step S106, then all the data distributed into the electrical lane signals by the OTUS are mapped into the same super optical channel (recorded as OChS, but this identifier does not represent defining the term) for transmission, wherein the rate of the OChS is M*100 Gb/s, and the M groups of electrical lane signals can be carried by a single frequency slot or multiple non-continuous frequency slots, each frequency slot can carry m groups of electrical lane signals, $1 \le m \le M$, and m is an integer.

In the above-mentioned steps, by means of mapping data to a super optical channel data unit and mapping the super optical channel data unit into a super optical channel transport unit, then distributing the super optical channel transport unit into multiple electrical lane signals of multiple electrical layer lanes, and finally mapping all the data distributed into the multiple electrical lane signals into the same super optical channel for transmission, the problem of how to effectively plan and manage the spectrum after introducing the flexible grid technology in the related art is solved, so that the operator can deploy a beyond 100 G optical transport system more flexibly and is no longer limited to the selection of a fixed rate, improving optical fibre spectrum utilization efficiency as well as system flexibility and compatibility.

It should be noted that the ODUS, OTUS and OChS here have a flexible super rate.

The tributary slot size of the ODUS is 100 G bit/s, which can reduce the power consumption of hardware or a chip, and with regard to the tributary slot size of 1.25 G bit/s or 10 G bit/s, the method needs less hardware resources.

According to an embodiment of the disclosure, in step S102, a low speed service data is aggregated to an ODU4 (i.e. an optical channel data unit, and the rate grade thereof is 100 G bit/s) firstly, and then is mapped to a low order ODUS, wherein the rate of the low speed service data is less than or equal to 100 G bit/s; and a high speed service data is mapped to the ODUS directly, wherein the rate of the low speed service data is less than or equal to 100 G bit/s, and the rate of the high speed service data is greater than 100 Gb/s. During an implementation process, the above-mentioned low speed service data can at least comprise one of the following: ODU0, ODU1, ODU2, ODU2e, ODU3, and ODUflex. The method is simple and useful and strong in operability.

According to an embodiment of the disclosure, the above-mentioned ODUS can support at least one of the following service data: an ODU4 service, a low order ODUS service, a packet service, a 400 G bit/s Ethernet, and 1 T bit/s Ethernet (can be referred to as 400 GE/1 TE).

According to an embodiment of the disclosure, when N is 4, a respective electrical layer lane rate of each group of electrical lane signals is 25 G bit/s; when N is 2, a respective electrical layer lane rate of each group of electrical lane signals is 50 G bit/s; and when N is 1, a respective electrical layer lane rate of each group of electrical lane signals is 100 G bit/s.

According to an embodiment of the disclosure, in step S106, one of the frequency slots can comprise one or more continuous optical carriers (referred to as OCs), and each of the OCs supports at least one 100 G slot.

Figure 2:
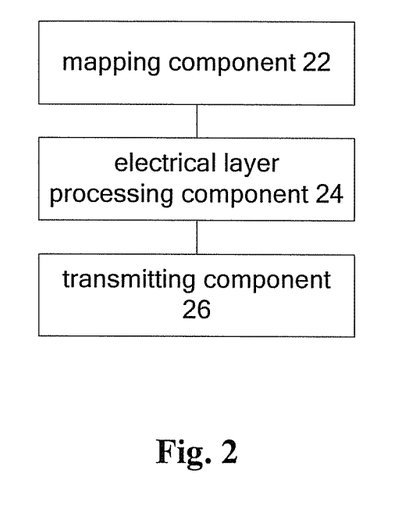
FIG. 2 shows a structure diagram of a device for transmitting data according to an embodiment of the disclosure.

Corresponding to the method above, a device for transmitting data is further provided in the embodiment of the disclosure. FIG. 2 shows a structure diagram of a device for transmitting data according to an embodiment of the disclosure. As shown in FIG. 2, the device comprises: a mapping component 22, which is configured to map data to an ODUS, and map the ODUS into an OTUS, wherein the rate of the ODUS and the OTUS are M*100 Gb/s, M is a positive integer greater than or equal to 2, and the tributary slot size of the ODUS and the OTUS are 100 Gb/s; an electrical layer processing component 24, coupled to the mapping component 22, which is configured to distribute the OTUS into M groups of electrical lane signals, wherein each group of electrical lane signals corresponds to N electrical layer lanes, and N is a positive integer; and a transmitting component 26, coupled to the electrical layer processing component 24, which is configured to map all the data distributed into the electrical lane signals by the OTUS into the same OChS for transmission, wherein the rate of the OChS is M*100 Gb/s, and the M groups of electrical lane signals are carried by a single frequency slot or multiple non-continuous frequency slots, each frequency slot carries m groups of electrical lane signals, 1≤m≤M, and m is an integer.

In the above-mentioned device, the mapping component 22 maps data to a super optical channel data unit and maps the super optical channel data unit into a super optical channel transport unit, the electrical layer processing component 24 distributes the super optical channel transport unit into multiple electrical lane signals of multiple electrical layer lanes, and the transmitting component 26 maps all the data distributed into the multiple electrical lane signals into the same super optical channel for transmission, the problem of how to effectively plan and manage the spectrum after introducing the flexible grid technology in the related art is solved, so that the operator can deploy a beyond 100 G optical transport system more flexibly and is no longer limited to the selection of a fixed rate, improving optical fibre spectrum utilization efficiency as well as system flexibility and compatibility.

According to an embodiment of the disclosure, the mapping component 22 is further configured to aggregate low speed service data to an ODU4 firstly, then map to a low order ODUS, and map high speed service data to the ODUS directly, wherein the rate of the low speed service data is less than or equal to 100 G bit/s, and the rate of the high speed service data is greater than 100 G bit/s. For example, the above-mentioned ODUS supports at least one of the following service data: an ODU4 service, a low order ODUS service, a packet service, and 400 GE/1 TE.

According to an embodiment of the disclosure, one of the above-mentioned frequency slots can comprise one or more continuous OCs, and each of the OCs supports at least one 100 G slot.

The implementation process of the above-mentioned embodiments is described in details with reference to the preferred embodiments and the accompanying drawings below.

Embodiment 1

Other than selecting a next fixed bit rate for an Ethernet and an optical transport network (referred to as OTN), a method and a device for transmitting data are provided in the present embodiment, which can extend the architecture of the optical transport network and provides a super optical channel data unit (referred to as ODUS) with a flexible super rate. The present embodiment does not adopt the method of selecting a fixed bit rate for an optical transport network of the next generation, because selecting a flexible bit rate can enable the operator and the equipment vendor to better use the advanced hardware capability, for example, in the hardware aspect of the optical transport network, a software programmable modulator is used so that a modulation scheme can be flexibly selected both in the modulation depth and in the amount of optical carriers so as to optimize bit rate and spectrum occupancy for a specific optical transport distance. The flexibility provided by the present embodiment can be used in a network planning phase or after the network is deployed. Therefore, a beyond 100 G data transmission method and device of the present embodiment can be used to make the operator deploy a beyond 100 G system more flexibly.

Figure 3:
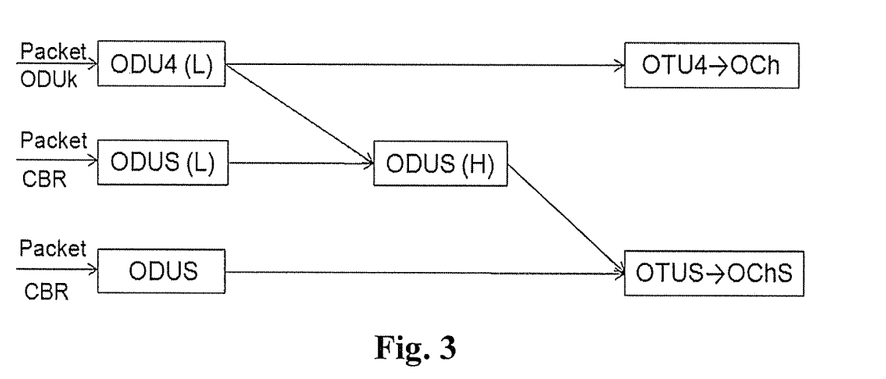
FIG. 3 shows a schematic diagram of a multiplexing system architecture for extending an optical transport network according to embodiment 1 of the disclosure.

Compared with selecting one or more fixed bit rates (e.g. an ODU5 being 400 G bit/s and an ODU6 being 1 T bit/s) for an optical transport network technique of the next generation, the present embodiment extends the system architecture of an optical transport network (referred to as OTN). FIG. 3 shows a schematic diagram of a multiplexing system architecture for extending an optical transport network according to embodiment 1 of the disclosure. As shown in FIG. 3, a flexible super optical channel data unit (referred to as ODUS) is defined, and the rate of the super optical channel data unit (ODUS) is N-fold 100 G bit/s, wherein N is an integer great than or equal to 2. Firstly, the super optical channel data unit (ODUS) is mapped into a super optical channel transport unit (referred to as OTUS), and the OTUS is born by a super optical channel (referred to as OChS). That is to say, a mapping and multiplexing structure is ODUS-OTUS-OChS.

Preferably, the tributary slot size of 100 G bit/s can be selected for the super optical channel data unit (ODUS) in the present embodiment, which can reduce the complexity of hardware, and chip area and power consumption with regard to using the tributary slot size granularity of 1.25 G bit/s or 10 G bit/s. During an implementation process, the ODUS with the tributary slot size granularity of 100 G bit/s can carry a packet service via a GFP or directly, and that is to say, the packet can be directly mapped into the ODUS, or the combination of an ODU4 carrying ODU0, ODU1, ODU2, ODU2e, ODU3 and ODUflex and a low order ODUS(L) carrying the packet or a constant bit rate service is mapped into a high order super optical channel data unit (ODUS(H)). For example, two ODU4s (200 G bit/s altogether) loaded with low order signals (ODU0, ODU1, ODU2, ODU2e, ODU3 and ODUflex) or a packet service and a low order ODUS(L) carrying a packet service with a 200 G rate are multiplexed into a 400 G high order ODUS (H). An original OTN rate container ODUk (k=0, 1, 2, 2e, 3, flex) can be mapped to the ODU4 firstly and then the ODU4 is mapped to the ODUS.

Based on the ODUS-OTUS-OChS structure above in the present embodiment, the spectrum resource of the fibre is need to be continuous, so as to adequately support mapping the ODUS to a single OChS signal directly; however, if a continuous frequency slot wide enough to carry the capacity of the ODUS cannot be provided by the fibre, the method for improving spectrum utilization efficiency in the present embodiment can be used.

Preferably, the super optical channel data unit (ODUS) can be firstly mapped to the super optical channel transport unit (OTUS) in the present embodiment, then the OTUS is distributed into multiple electrical lane signals, and then the multiple electrical lane signals are mapped to the same OChS for transmission.

Embodiment 2

Figure 4:
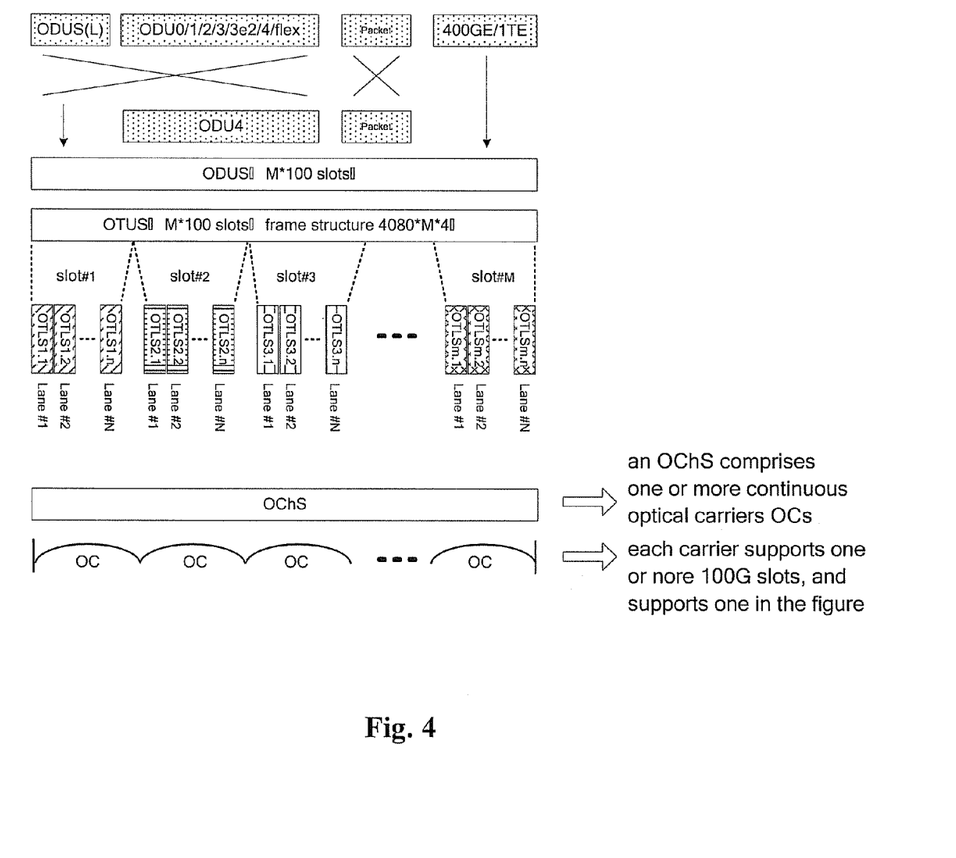
FIG. 4 shows a schematic diagram of mapping and multiplexing processing flows of ODUS-OTUS-OChS according to embodiment 2 of the disclosure.

FIG. 4 shows a schematic diagram of mapping and multiplexing processing flows of ODUS-OTUS-OChS according to embodiment 2 of the disclosure. As shown in FIG. 4, the processing flow comprises the following steps:

Step S401, all low speed (<100 G) services are aggregated to an ODU4 firstly, then aggregated to an ODUS, and beyond 100 G services are mapped to the ODUS directly; wherein the ODUS supports mapping four services, ODU4, low order ODUS, packet and 400 GE/1 TE, and the rate is M*100 Gb/s, m≥2; and a super optical channel data unit (ODUS) is mapped into an OTUS.

Step S402, each OTUS corresponds to M 100 G slots, and each 100 G slot corresponds to a group of OTLSm.ns.

Step S403, each group of OTLSm.ns corresponds to N electrical layer lanes, and if N=4/2/1, the corresponding electrical layer rate is 25 G/50 G/100 G, wherein m in the OTLSm.n is a serial number of a 100 G slot in the ODUS, 1≤m≤M, and n is a serial number of an electrical layer lane, 1≤n≤N.

Step S404, the OTUS is mapped into an OChS, wherein the OChS is carried by a frequency slot, and the OChS can support multiple groups of 100 G slots and multiple carriers, a physical layer is an independent optical layer channel, and each carrier supports one or more 100 G slots.

Embodiment 3

Figure 5:
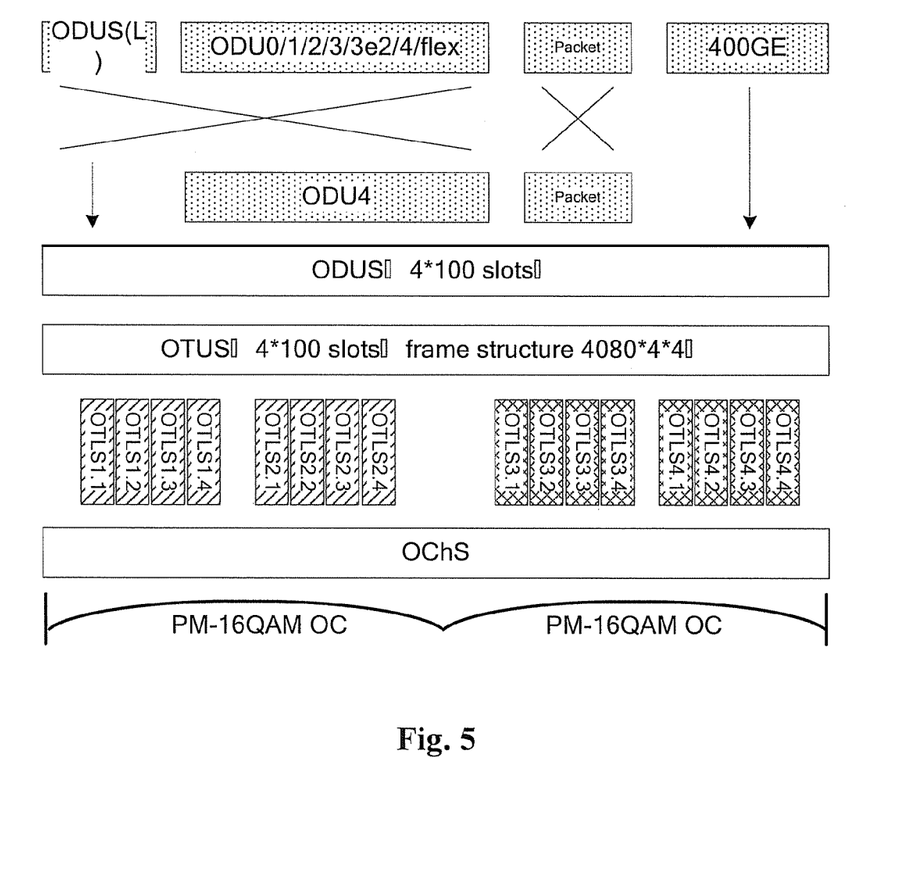
FIG. 5 shows a schematic diagram of mapping and multiplexing processing flows of ODUS-OTUS-OChS according to embodiment 3 of the disclosure.

A method and device for transmitting data for a beyond 100 G optical transport network is provided in the disclosure. The method for transmitting data of the present embodiment is described by taking mapping two ODU4s (the total rate of two ODU4s is 400 G bit/s) loaded with low order signals (e.g. ODU0, ODU1, ODU2, ODU2e, ODU3, and ODUflex) or a packet service and a 200 G bit/s packet service into a low order ODUS as an example below, and the bit rate of the ODUS is 400 G bit/s. FIG. 5 shows a schematic diagram of mapping and multiplexing processing flows of ODUS-OTUS-OChS according to embodiment 3 of the disclosure. As shown in FIG. 5, the processing flow comprises the following steps:

Step S501, a packet service (e.g. 200 G bit/s) encapsulated via a GFP or is directly mapped to a low order super optical channel data unit ODUS(L).

Step S502, a low order optical channel data unit (ODUk, k=0, 1, 2, 2e, 3, flex) or a 100 G bit/s packet service is mapped to an ODU4.

It should be specifically stated: if a bandwidth required by the packet service is just as the rate grade of the ODUS, the ODUS is wholly used to load the packet service.

Step S503, two ODU4s loaded with low order signals (e.g. ODU0, ODU1, ODU2, ODU2e, ODU3 and ODUflex) or a packet service and a super low order optical channel data unit ODUS(L) loaded with a 200 G bit/s packet service are multiplexed into a high order super optical channel data unit (ODUS) together.

Step S504, the super optical channel data unit (ODUS) is mapped into a super optical channel transport unit (OTUS).

Step S505, the OTUS is mapped into an OChS, wherein the OChS is carried by a continuous frequency slot; the OTUS is distributed into 16 electrical lane signals, wherein the rate grade of each electrical lane signal is 25 G and then the 16 electrical lane signals are divided into four groups, wherein each group comprises four electrical lane signals; then multiple electrical lane signals as groups are mapped into an OChS; wherein the rate of the OChS can be able to determined according to the rate and the number of electrical lane signals in the groups mapped to the OChS.

Step S506, the mapped super optical channel (OChS) is modulated into a single optical carrier or multiple optical carriers for transmission, wherein an OChS signal is carried by a section of continuous frequency slot for transmission. In the present embodiment, two optical carriers are used, and each optical carrier is transmitted by using a PM 16QAM modulation mode.

Embodiment 4

Figure 6:
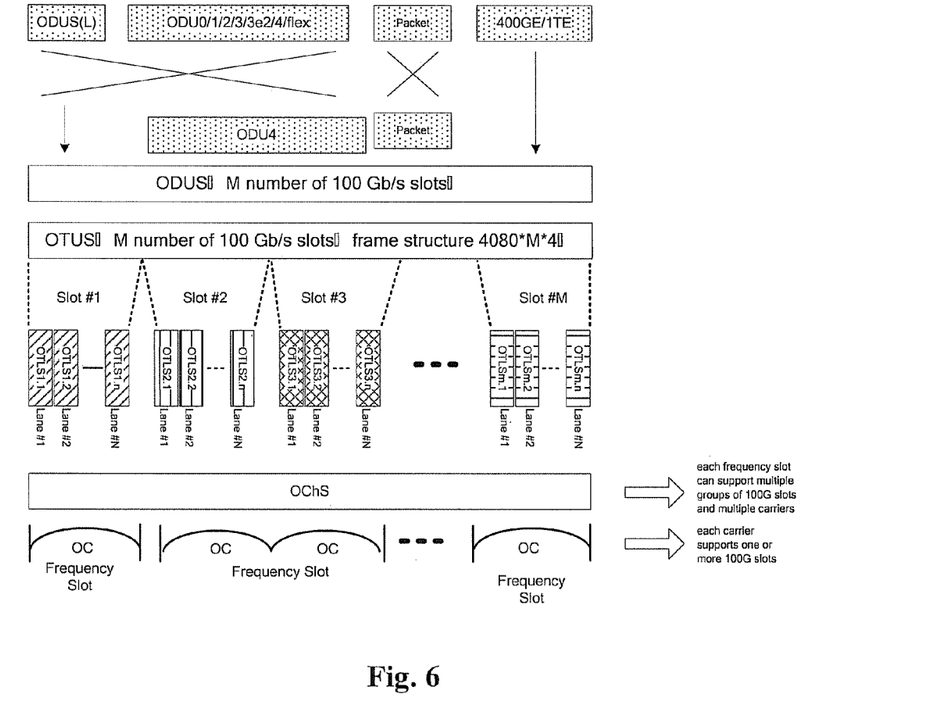
FIG. 6 shows a schematic diagram of mapping and multiplexing processing flows of ODUS-OTUS-OChS according to embodiment 4 of the disclosure.

FIG. 6 shows a schematic diagram of mapping and multiplexing processing flows of ODUS-OTUS-OChS according to embodiment 4 of the disclosure. As shown in FIG. 6, the processing flow comprises the following steps:

Step S601, all low speed (<100 G) services are aggregated to an ODU4 firstly, then aggregated to an ODUS, and beyond 100 G services are mapped to the ODUS directly; wherein the ODUS supports mapping four services, ODU4, low order ODUS, packet and 400 GE/1 TE, and the rate is M*100 G bit/s, m≥2; and a super optical channel data unit (ODUS) is mapped into an OTUS.

Step S602, each OTUS corresponds to M 100 G slots, and each 100 G slot corresponds to a group of OTLSm.ns.

Step S603, each group of OTLSm.ns corresponds to N electrical layer lanes, and if N=4/2/1, the corresponding electrical layer rate is 25 G/50 G/100 G, wherein m in the OTLSm.n is a slot serial number, 1≤m≤M, and n is a serial number of an electrical layer lane, 1≤n≤N.

Step S604, the OTUS is mapped into an OChS, and the OChS is carried by multiple non-continuous frequency slots, wherein each frequency slot can support multiple groups of 100 G slots and multiple carriers, and each carrier supports one or more 100 G slots, i.e. M groups of electrical lane signals is able to be carried by multiple non-continuous frequency slots, and each frequency slot is able to carry m groups of electrical lane signals, 1≤m≤M.

Embodiment 5

Figure 7:
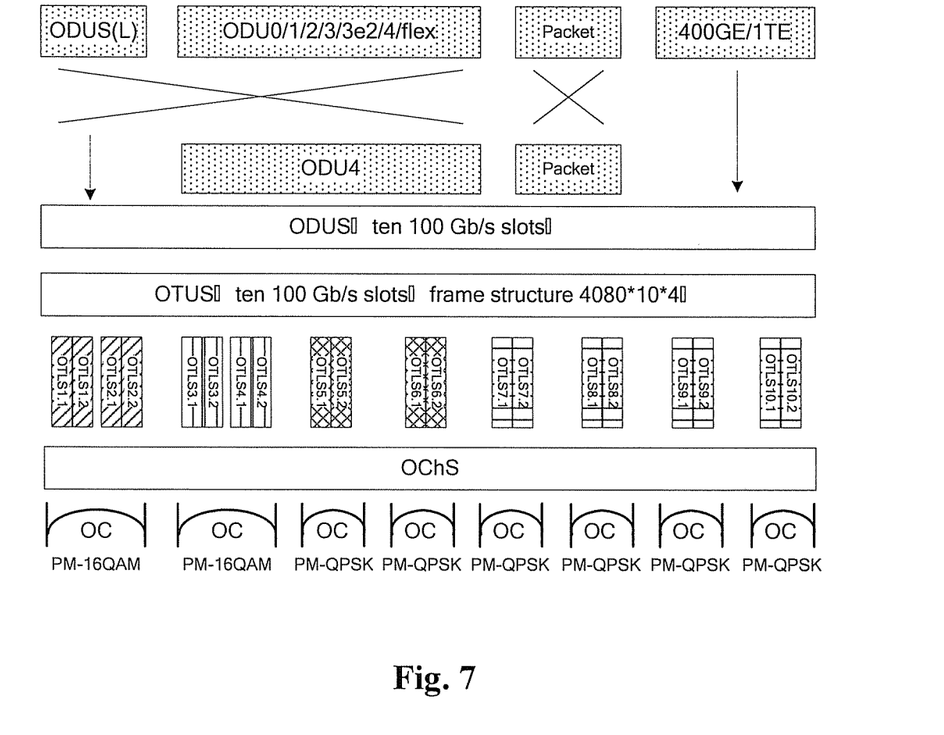
FIG. 7 shows a schematic diagram of mapping and multiplexing processing flows of ODUS-OTUS-OChS according to embodiment 5 of the disclosure.

A method for inverse multiplexing beyond 100 G is provided in the present embodiment, and the method for transmitting data of the present embodiment is described by taking a 1 Tbit/s ODUS and OTUS as an example, for instance, a 1 Tbit/s OTUS is inversely multiplexed to two 200 G bit/s and six 100 G bit/s. FIG. 7 shows a schematic diagram of mapping and multiplexing processing flows of ODUS-OTUS-OChS according to embodiment 5 of the disclosure. As shown in FIG. 7, it is the specific embodiment of inversely multiplexing a 1 Tbit/s OTUS to two 200 G bit/s and six 100 G bit/s, and the processing flow comprises the following steps:

Step S701, a packet service (e.g. 200 G bit/s) encapsulated via a GFP or is directly mapped to a low order super optical channel data unit ODUS(L).

Step S702, a low order optical channel data unit (ODUk, k=0, 1, 2, 2e, 3, flex) or a 100 G bit/s packet service is mapped to an ODU4.

Step S703, the ODU4 loaded with low order signals (e.g. ODU0, ODU1, ODU2, ODU2e, ODU3 and ODUflex) or a packet service and a super low order optical channel data unit ODUS(L) loaded with a packet service are mapped into a high order super optical channel data unit ODUS(H) together.

Step S704, the super optical channel data unit (ODUS) is mapped into a super optical channel transport unit (OTUS).

Step S705, the OTUS is mapped into an OChS, and the OChS is carried by multiple non-continuous frequency slots; the OTUS is distributed into 20 electrical lane signals OTLSm.n, wherein m is a serial number of a 100 G bit/s slot in the OTUS, and n is a serial number of an electrical lane signal, for example, the OTUS with a 1 Tbit/s rate is able to be distributed to 20 electrical lane signals with a 50 G bit/s rate, 1 Tbit/s is composed of ten 100 G bit/s slots, and thus the value of m is 1 to 10; moreover, a 100 G bit/s slot is able to be composed of two 50 G bit/s electrical lane signals, and thus the value of n is 1 to 2, which represents a serial number of the electrical lane signal in each 100 G bit/s slot; therefore, the electrical lane signals is divided into 10 groups altogether, wherein each group comprises two 50 G bit/s electrical lane signals.

Step S706, two groups of electrical lane signals therein are mapped to a frequency slot, and the frequency slot is transmitted by a single optical carrier modulated by a PM-16QAM modulation mode; also another two groups of electrical lane signals are mapped to a frequency slot which also is transmitted by the same single optical carrier modulated by the PM-16QAM modulation mode; and the remaining six groups of electrical lane signals are mapped to different frequency slots respectively, and all the frequency slots is transmitted by a single optical carrier modulated by a PM-QPSK modulation mode.

In conclusion, a method and device for transmitting data are provided for a beyond 100 G optical transport network in the embodiments of the disclosure so that the optical transport network of the next generation is no longer limited to the selection of a fixed rate and the optical fibre spectrum utilization efficiency can be improved, which provides a flexible evolution method for the optical transport network of the next generation of the operator.

Obviously, those skilled in the art shall understand that the above-mentioned components and steps of the disclosure can be realized by using general purpose calculating device, can be integrated in one calculating device or distributed on a network which consists of a plurality of calculating devices. Alternatively, the components and the steps of the disclosure can be realized by using the executable program code of the calculating device. Consequently, they can be stored in the storing device and executed by the calculating device, or they are made into integrated circuit component respectively, or a plurality of components or steps thereof are made into one integrated circuit component. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the spirit and principle of the disclosure shall all fall within the protection scope of the disclosure.

What is claimed is:

1. A method for transmitting data, comprising:
mapping data to a Super Optical channel Data Unit (ODUS), and mapping the ODUS into a Super Optical channel Transport Unit (OTUS), wherein the rate of the ODUS and the OTUS are M*100 Gb/s, M is a positive integer greater than or equal to 2, and the tributary slot size of the ODUS and the OTUS are 100 Gb/s;
distributing the OTUS into M groups of electrical lane signals, wherein each group of electrical lane signals corresponds to N electrical layer lanes, and N is a positive integer;
then mapping all the data distributed into the electrical lane signals by the OTUS into the same super Optical Channel (OChS) for transmission, wherein the rate of the OChS is M*100 Gb/s; and
the M groups of electrical lane signals are carried by a single frequency slot or multiple non-continuous frequency slots, each frequency slot carries m groups of electrical lane signals, 1≤m≤M, and m is an integer.

2. The method according to claim 1, wherein mapping data to the ODUS comprises:
aggregating low speed service data to an ODU4 firstly, and then mapping to the ODUS; and
mapping high speed service data to the ODUS directly, wherein the rate of the low speed service data is less than or equal to 100 Gb/s, and the rate of the high speed service data is greater than 100 Gb/s.

3. The method according to claim 2, wherein the low speed service data at least comprises one of the following: ODU0, ODU1, ODU2, ODU2e, ODU3, and ODUflex.

4. The method according to claim 3, wherein one of the frequency slots comprises one or more continuous optical carriers (OCs), and each of the OCs supports at least one 100 G slot.

5. The method according to claim 2, wherein one of the frequency slots comprises one or more continuous optical carriers (OCs), and each of the OCs supports at least one 100 G slot.

6. The method according to claim 1, wherein the ODUS supports at least one of the following service data: an ODU4 service, a low order ODUS service, a packet service, and a 400 G/1 T Ethernet.

7. The method according to claim 6, wherein one of the frequency slots comprises one or more continuous optical carriers (OCs), and each of the OCs supports at least one 100 G slot.

8. The method according to claim 1, wherein when N is 4, a respective electrical layer lane rate of the each group of electrical lane signals is 25 Gb/s; when N is 2, a respective electrical layer lane rate of the each group of electrical lane signals is 50 Gb/s; and when N is 1, a respective electrical layer lane rate of the each group of electrical lane signals is 100 Gb/s.

9. The method according to claim 8, wherein one of the frequency slots comprises one or more continuous optical carriers (OCs), and each of the OCs supports at least one 100 G slot.

10. The method according to claim 1, wherein one of the frequency slots comprises one or more continuous optical carriers (OCs), and each of the OCs supports at least one 100 G slot.

11. A device for transmitting data, comprising:
a mapping component, configured to map data to a Super Optical channel Data Unit (ODUS), and map the ODUS into a Super Optical channel Transport Unit (OTUS), wherein the rate of the ODUS and the OTUS are M*100 Gb/s, M is a positive integer greater than or equal to 2, and the tributary slot size of the ODUS and the OTUS are 100 Gb/s;
an electrical layer processing component, configured to distribute the OTUS into M groups of electrical lane signals, wherein each group of electrical lane signals corresponds to N electrical layer lanes, and N is a positive integer; and
a transmitting component, configured to map all the data distributed into the electrical lane signals by the OTUS into the same super Optical Channel (OChS) for transmission, wherein the rate of the OChS is M*100 Gb/s, and the M groups of electrical lane signals are carried by a single frequency slot or multiple non-continuous frequency slots, each frequency slot carries m groups of electrical lane signals, 1≤m≤M, and m is an integer.

12. The device according to claim 11, wherein the mapping component is further configured to aggregate low speed service data to an ODU4 firstly, then map to the ODUS, and map high speed service data to the ODUS directly, wherein the rate of the low speed service data is less than or equal to 100 Gb/s, and the rate of the high speed service data is greater than 100 Gb/s.

13. The device according to claim 12, wherein one of the frequency slots comprises one or more continuous optical carriers (OCs), and each of the OCs supports at least one 100 G slot.

14. The device according to claim 11, wherein the ODUS supports at least one of the following service data: an ODU4 service, a low order ODUS service, a packet service, and 400 GE/1 TE.

15. The device according to claim 14, wherein one of the frequency slots comprises one or more continuous optical carriers (OCs), and each of the OCs supports at least one 100 G slot.

16. The device according to claim 11, wherein one of the frequency slots comprises one or more continuous optical carriers (OCs), and each of the OCs supports at least one 100 G slot.

* * * * *